United States Patent
Vazquez

(10) Patent No.: US 7,879,922 B2
(45) Date of Patent: Feb. 1, 2011

(54) RIGID, CLOSED-CELL, GRAFT-POLYMER FOAM; RIGID FLEXIBLE CELLULAR FOAM; RIGID FLEXIBLE CELLULAR FOAM MIXTURES; AND METHOD FOR MANUFACTURING A RIGID, CLOSED-CELL, GRAFT-POLYMER FOAM

(75) Inventor: Juan Miguel Vazquez, Miami, FL (US)

(73) Assignee: PolyuMAC Inc., Miami, FL (US)

( * ) Notice: Subject to any disclaimer, the term of this patent is extended or adjusted under 35 U.S.C. 154(b) by 584 days.

(21) Appl. No.: 11/942,979

(22) Filed: Nov. 20, 2007

(65) Prior Publication Data
US 2009/0131546 A1 May 21, 2009

(51) Int. Cl.
*C08F 2/48* (2006.01)
*C08F 259/04* (2006.01)
*C08J 9/04* (2006.01)

(52) U.S. Cl. .......................... 521/75; 521/90; 521/94; 521/139; 521/145; 521/149; 521/155; 521/189

(58) Field of Classification Search .................... 521/75, 521/90, 94, 139, 145, 149, 155, 189
See application file for complete search history.

(56) References Cited

U.S. PATENT DOCUMENTS

| | | | |
|---|---|---|---|
| 3,256,217 A * | 6/1966 | Landler et al. | 521/79 |
| 3,267,051 A | 8/1966 | Landler et al. | |
| 3,290,262 A * | 12/1966 | Leclercq | 521/83 |
| 4,469,819 A * | 9/1984 | Lemoine et al. | 521/79 |
| 4,786,547 A | 11/1988 | St-Michel | |
| 5,352,710 A * | 10/1994 | Lauri | 521/137 |

FOREIGN PATENT DOCUMENTS

| | | |
|---|---|---|
| FR | 885558 | 5/1943 |
| FR | 2480451 | 4/1981 |
| JP | 42-22560 | * 12/1964 |

* cited by examiner

*Primary Examiner*—Irina S Zemel
(74) *Attorney, Agent, or Firm*—Fleit Gibbons Gutman Bongini & Bianco, PL; Paul D. Bianco; Martin Fleit

(57) ABSTRACT

Expanded products, more specifically, rigid or semi-flexible foams of low density from 1.5 to 12 lbs/ft$^3$ or more, with closed cells can be manufactured. The products have a PVC backbone with branches with methacrylate crosslinked with isocyanate through a reaction activated by ultraviolet or microwave radiation. The use of polyfunctional monomers that are sensitive to irradiation yields a higher cross-link density, which improves the physical and mechanical properties such as hardness, resistance to abrasion, ductility, and resistance to friction. The selection of monomers and oligomers allows the manufacturer to determine of the final properties of the foam. The process yields foams with extreme hardness and better shear factors making the foam an ideal product for aerospace and windmill use. These physical properties emerge during the post-curing process, preferably by use of compounds based on methacrylates in dispersion with PVC and isocyanates.

10 Claims, No Drawings

RIGID, CLOSED-CELL, GRAFT-POLYMER FOAM; RIGID FLEXIBLE CELLULAR FOAM; RIGID FLEXIBLE CELLULAR FOAM MIXTURES; AND METHOD FOR MANUFACTURING A RIGID, CLOSED-CELL, GRAFT-POLYMER FOAM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The invention relates to rigid, closed cell foams and, in particular, to foams made with PVC backbones and epoxy-acrylated sidegroups crosslinked with diisocyantes and polymerized using photosensitive initiators.

2. Description of the Related Art

The preparation of compounds or mixtures with the purpose of manufacturing rigid foams on a PVC base is a very well known process that has been openly described in the scientific literature and in various international patents such as French patents Nos. 885,558 and 2,480,451 and U.S. Pat. Nos. 3,267,051 and 4,469,819. This, however, is completely different from the process described in this patent regarding both the compounds used and the development of the foam and cross-linking.

Recently, it has been discovered that polymer compounds or blends based on epoxy-oligomers react directly with isocyanates to form under certain chemical conditions (i.e. pressure, temperature, homogenization, etc.) a thermoplastic-thermofixed polymer. "Isocyanates" is a general term that is meant to include poly-isocanates as well as isocyanates, unless otherwise specified. These reactions take place only when these polymers or blends are subjected to elevated temperatures for relatively long periods of time. In contrast, when these blends are mixed at ambient temperature, the reactions described above do not take place because the conditions necessary for the generation of molecular excitation do not exist. There are also the epoxy-acrylates on the basis of diphenol A that react poorly in any temperature range.

BRIEF SUMMARY OF THE INVENTION

The present invention relates to the processes of production of foams of rigid or semi-flexible material on the basis of methacrylates and a PVC polymer joined by isocyanates. The use of mixtures of multifunctional or polyfunctional monomers combined with other additives (such as expansion agents, plasticizers, epoxy-acrylate monomers, alcohols, vinyl monomers, photoinitiators, etc.) is also described.

All these mixtures give as a result compounds that, after post-curing, are denominated IPN (Interpenetrating-Network-Polymer) or "embryo" and that will then be expanded in water between 90 and 100° C. and cross-linked by using ultraviolet radiation when they have reached the required size.

In developing the invention, experiments were conducting using various mixtures of monomers and oligomers. These mixtures were combined with photoinitiators in order to accelerate the reactions when subjected to the energy supplied by an ultraviolet lamp. It was discovered that this reaction does not take place even if the temperature of the mixture reaches 175° C. for a short period of time unless there is radiation present. The combination of monomers and oligomers with latent photoinitiators is what is termed "embryo".

These groups of epoxy-acrylate monomers with added blends and PVC based polymers along with other additives are mixed or imbibed during the process of solvatation (mixed at high speed, preferably in vacuum, with temperature up to 65° C.) in order to form an elastomeric thermoplastic dispersion in a semi-liquid state that then will be poured into closed molds and subjected for short intervals to pressures from 5 kg/cm$^2$ to 509 kg/cm$^2$ and temperatures from 150 to 175° C. The pressure can be external or generated by the expansion of the gasses that are generated in the process of decomposition due to the high temperature of the blowing agent.

The most important thing to mention in this discovery is that this compound (PVC) blended with epoxy-acrylate and isocyanate and subjected to pressure and heat for a short period of time does not manage to react completely as the result of the addition of some stabilizing additives. Examples of stabilizing additives include as dibasic lead sulfate, tribasic lead sulfate, or other metallic salts. The stabilizing additives act as padding elements during the process of PVC acidification in the inductive catalytic process that occurs during the exposure to continuous pressure and temperature. In this manner, the way is opened for the other reactions to form a cross-linking on the part of the isocyanates.

For their part, these blends are expanded with the help of primary expansion agents (organic solvents with boiling point between 50 and 100° C.). Examples of expansion agents include n-pentane, n-isopentane, n-isofluoromethane, trichlorfluormethane, gasoline, toluene, acetone, isopropyl-pentane, etc. When these solvents or combinations of them are subjected to temperatures that are above their boiling points, they are volatilized. The evaporation opens leads to construction of "micro-cells" for dispersion of the gasses in the interior of the elastomeric mass subjected to auto-pressure. Along with other intrinsic reactions, this opens the way for the formation of more cavities or micro-cells inside the polymeric mass due to the decomposition reactions of the organic expansion agents or combinations of them (azodi-isobutyronitrile, para-toluene-sulfonyl-semicarbazide, or azocarbodiamide) that are used. This produces predominantly carbon dioxide, which will dissolve in the mass of the polymer opening the way for formation of the "embryo".

The final result after the expansion induced by exposure with radiation is excellent with regard to the physical properties. The resulting physical properties of the block range from a rigid and crystalline structure to a semi-rigid structure having great flexibility. The resulting physical properties depend on the particular monomers and oligomers that are used. For example, a semi-rigid, yet flexible, structure can be made that has the following qualities: a half-inch thick or thicker board of foam being able to bend more than one-hundred-forty degrees (>140°) without breaking.

Emphasizing the above, in order to obtain the desired results, it is important to take into account the following.

1. The mixture has to be preformed with all additives and monomers varying their percentages in the formula and correctly choosing the monomers and the precursors along with the photoinitiators in order to implement the specific function (cross-linking).

2. The mixture must be prepared under vacuum (negative pressures) in order to prevent the isocyanate from reacting with the moisture of the air and thus preventing premature decomposition.

3. Mixtures of these monomers, such as epoxy-acrylate in liquid form (core-PVC blend), should not be subjected under any circumstances to temperatures higher than 180° C. for periods longer than fifteen (15) minutes as this can cause their degradation or activation through an inductive catalytic reaction (reaction of Michael=TH degrees centigrade=dissociation of radicals due to the temperature=inductive polymerization).

4. The expansion of these embryos will take place inside the specific molds, which will be submerged in hot water with a temperature between 90 and 100° C. for such period of time as is necessary for the completion of the desired expansion. Glycols and other additives can be added to the water in order to increase its boiling point and facilitate the work.

5. According to this invention, the mixture prepared in a mixer (such as those sold under the trade name HENSCHEL) under vacuum contains at least a second expansion agent. Suitable second expansion agents include those with azodicarbonamide and azodinitrosamine groups; these two compounds are used in proportions of 1 and 5% of the weight of the mixture. Weights above these percentages have been found to cause a distortion in the pre-forms or "embryos" during the expansion.

6. An embodiment of the polymer (polyvinylchloride—PVC) used in this invention can be specifically a polymer with high molecular weight with average viscosity between 80 and 180 centipoises according to the ASTM norms and with particle size less than five microns (<5 μm) obtained during the polymerization process. The high-molecular weight in PVC is defined as those with K-value higher than 75.

7. An example of a first expansion agent that can generate gasses in controlled amounts is toluene-2,4-diisocyanate or a blend of 2,6-diisocyanate and 4,4-diphenylmethane. This mixture can contain percentages that vary from 20 to 40% of the weight of the whole formulation.

8. Additional polymers can be used in combination with the "polymer-monomer" as a core, which is inflated through a process of solvatation produced by the monomer. The process is not able to completely dissolve the polymer and, consequently, the state of grafting is maintained. Examples of this core-grafted polymer are styrene, acrylonitryl, and methyl-methacrylate grafted to the elastomeric part of the core inflated with elastic polymers, such as butadiene or ethylacrylate.

The process according to the invention includes four steps:
1. Mixture, 2. Fusion (formation of the "embryo"), 3. Expansion (in water with temperature between 90 and 100° C.), 4. Cross-linking by irradiation (in the water or outside of it).

1. Mixture

The first step is to prepare a polymeric mixture or blend containing at least six groups of chemical components. All percentages given are weight percentages unless otherwise specified.

A. The first component of the polymeric blend is the PVC. Preferably, the polymeric blend has a K-Value greater than 75 and is an extremely fine powder having a particle size smaller than twenty microns (<20 μm). PVC represents from 10 to 60% by weight of the whole mixture. Depending on the desired physical properties, different granulations can also be used permitting variance in the properties of the foam, such as compression, flexibility reduction, etc.

B. The second component is an expansion agent, or combinations of them. When subjected to heat and pressure, the expansion agent release gasses or are converted into gasses that remain dissolved in the "embryo." These are used in proportions of 1 to 20% of the whole mixture depending on the required final density of the product.

C. The third component is the monomer or the oligomer, or combinations of them, selected to produce the required physical, mechanical, and chemical properties. These properties will depend directly on the configuration of the molecules of the monomer or its combinations (hard, flexible, crystalline, or elastic). The amount of these components is from 5 to 70% of the whole mixture. The monomer/oligomer component generates the structures that react through the action of the ultraviolet radiation.

Examples of these monomers and oligomers are polymethylmethacrylate, diacrylates, dimethyl methacrylate, and combinations of the reactants with multifunctional groups, such as the epoxy-acrylates, epoxy-diacrylates, epoxy-triacrylates, epoxy-pentacrylates, etc. The arms of these "macromonomers" (oligomeric epoxy acrylates) are linked through their polarities (−) to the "core" of the polymer, in this case, the PVC. The core of the polymer contains other polymerizable monomers therein. The other polymerizable monomers are predominantly those of the alkyl-acrylate and alkyl-methacrylate groups, especially those that contain from one to twelve atoms in its molecular structure. Besides the monomers previously listed, others are possible to the physical and mechanical properties of the product. Other possible monomers include glycidyl acrylate, glycidyl methacrylate, and glycidyl epoxy-acrylate. These components react with the molecular resonance of the carboxylic groups that are donors of the double bond to be polymerized during the cross-linking process by ultraviolet radiation to the post-cure state.

D. The fourth group of components includes the donors of free radicals or those that react to microwave resonance to generate them. The majority of the selected compounds are phosphated as the benzophenones, anthracenes, etc., which are the initiators of a catalytic reaction chemically induced by a free radical produced by the division of one photon with one hydrogen activating the polymerization of the other monomers that are still in a latent state in the chemical composition, which in this case is "foam". The percentage of utilization of those inside the mixture is normally minimal and is from 0.01 to 3%. In the case of benzophenone, the preferred percentage of utilization is 0.2%.

E. The fifth group is plasticizers. Examples of plasticizers are DOP ( ), DNP ( ), oils, and solvents. The oils help the plastification. An example of an oil is epoxidized soya. Possible solvents include acetone and methyl-methacrylate. The solvents give access to the PVC molecules generating an elastic closed reticular structure where the gasses are dissolved forming what we call the core of the polymer. These plasticizers represent between 5 and 35% of the whole mixture.

F. The sixth group of chemical components is isocyanates. Among them there are various groups of interest, which generate different properties in the final product. Examples are tolulene diisocyanate (2,4-isomer or a mixture of 2,4- and 2,6-isomers in approximately 65:35 or 80:20 proportions) (TDI), diphenylmethane-4,4'-diisocyanate (MDI), naphthylene-1,5-diisocyanate (NDI), 3,3'-dimethyldiphenyl-4,4'-diisocyanate (TODI), and hexamethylene diisocyanate (HDI). Between 10 and 40% of the total weight of the mass will be used: preferably, between 20 and 25%.

Isocyanates have the following principal characteristics and functions.

1. Isocyanates generate the nodes for the formation of the polymer on the basis of a reactive elastomeric root. The isocyanates begin to polymerize slowly in hot water (from 90 to 100° C.). The isocyanates will continue to facilitate the growth, sustain the expansion of the gasses, and generate the polymer matrix onto which the cross-linking between the methacrylates and the PVC.

2. The isocyanates are critical because the reactivity of the isocyanates is extremely high and the selection of the compounds to integrate into the "embryo" is extremely delicate because it does not permit the presence of components that react with the isocyanate when it reaches 175° C. This characteristic establishes a big difference between the invention and the prior art. If, in the presence of isocyanates and methacrylates (subjected to a temperature of 175° C.), anhydride elements (such as phthalates, maleates, succinates, acrylates, crotonates, etc.) are introduced, the isocyanates will react instantaneously with the previous components. This reaction would result in a thermofixed polymer with a high level of hardness, but that is impossible to expand.

2. Fusion

In this step of the process, the plastisol is molded at temperatures between 120 and 200° C., preferably at 175° C., subjected to pressure between 5 and 500 bars. As previously stated, this pressure can be generated externally with respect to the mold by using a hydraulic press, or simply internally by the gasses, which get generated and cannot expand. Because the polymer is in a liquid phase, the gasses get dissolved in the polymer and, when the polymer begins to cool, the gases remain trapped therein. In this phase, thermoplastic material is formed, which can be characterized as an elastomer with a soft texture containing in its interior millions of closed cells that vary in size between 5 and 10 microns, are symmetrically ordered, and contain in their interiors combinations of dissolved gasses, such as carbon dioxide, nitrogen and other gasses, depending on the expansion agents that have been used. These dissolved gasses are responsible for the density of the foam. For masses with a thickness of 2.54 cm, it will be necessary to stabilize the uniformity of the thermoplastic material maintaining it subjected to 175° C. for 10 minutes and then quickly cooling the mold down to a temperature not higher than 15° C. before opening the mold and taking the elastomeric mass called the "embryo" out of it.

3. Expansion

During the third step, the polymeric compound, or the "embryo", is expanded when it makes contact with the water. The embryo is subjected to water for varying periods of time, depending on its thickness. The water is at temperatures from 90 to 100° C. The water is used as an ideal element for transferring the heat and the water gets diffused through the membranes of the cells where the water reacts with the isocyanate. As an example, for a "embryo" with dimensions of 15.2×15.2×2.54 cm and with density of 860 kg/m$^3$, the necessary time for expansion is 6 to 8 hours in order to reach a density of 64 kg/m$^3$, which is more than fourteen times (14×) its initial volume.

In this step, the expansion can be set in a mold with specific dimensions according to the density that is required for the final product. The mold allows the "embryo" to expand freely until it fills out the mold or cage where it has been immersed.

The reactions that take place during the third phase have not been completely defined from the chemical point of view, but some of the phases that take place during the reaction are already known. For example, it is known that the primary and secondary alcohols are utilized. The primary and secondary alcohols release water due to the slow acidification of the PVC. In turn, the PVC produces hydrochloric acid during the formation of the "embryo". These reactions have as a consequence the release of some water molecules, which react simultaneously with the polyisocyanates or the isocyanates producing as a result an amine ($NH_2$), which releases carbon dioxide ($CO_2$) inside the cells already containing gasses from the primary processes of expansion, or with a fourth or a fifth component, if any.

The amine produced in this process reacts with the groups of the adjacent isocyanates. This reaction continues until all N—H groups stop reacting with the free isocyanates. The result is a process of expansion due to the internal pressure of the gasses dissolved in the elastomeric mass restrained by a molecular mesh where the cross-linking of isocyanate with isocyanate is initiated. At the same time, the elastomeric mass carries in its spaces the macromolecules of the monomers and the oligomers, which do not react and act as hinge expanders until they have been reached by some free radical produced by the ultraviolet light, thus completing the cross-linking.

4. Crosslinking by Irradiation

This fourth step determines the physical, mechanical, and chemical properties of the foam. This step differentiates the invention from the prior art. In this process, the PVC has been selected as the initial macromolecule, around which an elastomer based on the isocyanate will be formed. This is the carrier of the monomer and oligomer macromolecules and with which a reticula is formed during the expansion but without reacting until irradiated.

The blocks of foam are irradiated with ultraviolet light during varying periods of time depending on the intensity of the lamps, the thickness of the block, and the quantity and quality of the photoinitiators included in the mixture. If the irradiation is weaker than required, a distortion in the size of the block (reduction and deformation) results; in many cases, the foam will never harden.

It is also possible to achieve the cross-linking by exposing the block to microwave radiation with frequencies between 925 and 2.450 MHz. These are the most frequently used frequencies, but it is also possible to use other frequencies for irradiation. It is important to use a microwave with low intensity (i.e. low wattage, for example, less than 0.25 Watts per pound of material) in order to allow the homogeneous dispersion of the heat and to prevent the generation of distortion zones due to overheating.

Irradiating the block with ultraviolet light is preferred when the polymer mass is in the final phase inside the water because, in this way, the cross-linking is initiated and the irradiation facilitates growth.

If necessary, for very thick blocks, the cross-linking can continue in a chamber at 60° C. with a relative humidity between 60 and 80%.

Other features that are considered as characteristic for the invention are set forth in the appended claims.

Although the invention is illustrated and described herein as embodied in a rigid, closed-cell, graft-polymer foam, a rigid flexible cellular foam, a rigid flexible cellular foam mixture, a rigid flexible cellular foam mixture, and a method for manufacturing a rigid, closed-cell, graft-polymer foam, it is nevertheless not intended to be limited to the details shown, because various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying examples.

BRIEF DESCRIPTION OF THE SEVERAL VIEWS OF THE DRAWING

Not Applicable

DETAILED DESCRIPTION OF THE INVENTION

Referring now to the examples, the following foams are taught.

The following common procedures are used in each of the examples unless they are specified to be otherwise.

1. The mixtures will be made in a processor such as those sold under the trade name HENSCHEL, under vacuum. The vacuum (i.e. negative pressure) should not exceed 47 kPa in order to avoid the loss of liquid.

2. All liquids will be added and mixed.

3. The blowing agent solids and the stabilizing additives are added and mixed.

4. At the end, the PVC is added and it will be mixed with all elements added previously.

5. If liquid blowing agents, such as N-pentane, pentane 141-B, acetone, methylene chloride and others are included, the blowing agents should be the last to be mixed in the reactor, preferably without vacuum and at very low RPM: i.e. less than 100 RPM.

The mold is preferably aluminum, cylindrical, with 0.64 cm walls, with a lid, and its interior dimensions will be 2.54 cm thick and with a diameter of 6.4 cm.

The mold should have a means for measuring the temperature in the interior of the compound. The preferred embodiment of the means for measuring the temperature is a thermocouple.

The mold is hermetically closed in order that the gasses and the plastisol, which is formed inside it, cannot escape.

A preferred embodiment of the oven is one like that sold under the trade name BLUE M, MODEL POM-256B-1. The oven is set at 175° C.

The following abbreviations for chemical products and the like are used throughout the specification:
Methylene Diphenyl Diisocyanate=MDI
Dioctyl Phthalate=DOP
Isopropyl Alcohol=Isopropyl
Glycidyl Methacrylate=Glycidyl
Diglycidyl Ether of Biphenol=DER
N-Butyl Methacrylate=N-Butyl
Irgacure 819=Irgacure 819
N-Pentane=Pentane
Dinitrosopentamethylenetetramide=Dinitrose
Irganox 1135=Irganox 1135
Polyvinyl Chloride=PVC
NIPOL 1312 LV=Butadiene Plastisol
2-Ethylhexyl Methacrylate=2-Ethylhexyl Methacrylate
Methylene Chloride=Methylene Chloride
Terephthalic Acid=Terephthalic Acid
Maleic Anhydride 98+%=Maleic Acid
Succinic Anhydride=Succinic Acid
SOL 225 EB Retarder=EB Retarder
DC 193 Surfactant=DC 193
Azodicarbonamide=ADCA
Methacrylic Acid=Methacrylic Acid
2,2'-azobis(2-methylpropanenitrile)=VAZO® 67

EXAMPLE 1

| | |
|---|---|
| MDI | 25 g |
| DOP | 8 g |
| Isopropyl | 4.5 g |
| Glycidyl | 6 g |
| DER | 6 g |
| N-Butyl | 3 g |
| Irgacure 819 | 0.3 g |
| Pentane | 8 g |
| Dinitrose | 8 g |
| Irganox 1135 | 0.3 g |
| PVC | 50 g |

Procedure

After the mixture is prepared, the mixture is put in the mold, the mold is closed and is left for ten (10) minutes in order that the internal plastification becomes uniform. Then, the mold is put in the oven at 175° C. and is stabilized at that temperature for ten (10) minutes in order to stimulate the generation of gasses and their dispersion in the plastisol.

After that, the mold is cooled until the mixture reaches the temperature of 15° C. and then the mixture removed and allowed to expand at 95° C. for six (6) hours in a bottomless cage, under water, in order to grow freely. The mixture is then subjected for one (1) hour to ultraviolet light with a frequency of 365 nMM and intensity of 100 W.

This procedure is referred to as "Standard" and will be used throughout the other examples unless a difference is explicitly mentioned.

Results

The resulting foam has a high level of hardness, a density of approximately 83 kg/m$^3$, and cells with medium sizing from 0.5 to 2.0 mm.

EXAMPLE 2

| | |
|---|---|
| MDI | 25 g |
| DOP | 8 g |
| Isopropyl | 2 g |
| Glycidyl | 10 g |
| DER | 6 g |
| N-Butyl | 3 g |
| Irgacure 819 | 0.3 g |
| Pentane | 5 g |
| Dinitrose | 6 g |
| Irganox 1135 | 0.3 g |
| PVC | 50 g |

Procedure

The standard procedure is used for Example 2.

Results

An extremely rigid crystalline foam is produced with very large cells between 1.5 and 3.0 mm with very hard walls and with an average density of 72 kg/m³.

EXAMPLE 3

| | |
|---|---|
| MDI | 25 g |
| DOP | 8 g |
| Isopropyl | 6 g |
| Glycidyl | 6 g |
| DER | 2 g |
| N-Butyl | 1 g |
| Irgacure 819 | 0.3 g |
| Pentane | 5 g |
| Dinitrose | 6 g |
| Irganox 1135 | 0.3 g |
| PVC | 50 g |

Procedure

The standard procedure is applied.

Result

The resulting initial mixture is extremely liquid-like (i.e. viscocity lower than 500 cps). The resulting foam will have a density lower than 29 kg/m³. The cells are very large with an average size of 2 mm, with some cells reaching 6 mm. The cellular structure is not very uniform. The resulting material is rigid, but very brittle.

EXAMPLE 4

| | |
|---|---|
| MDI | 25 g |
| DOP | 8 g |
| Isopropyl | 0 g |
| Glycidyl | 6 g |
| DER | 2 g |
| N-Butyl | 4 g |
| Irgacure 819 | 0.3 g |
| Pentane | 2 g |
| Dinitrose | 6 g |
| Irganox 1135 | 0.5 g |
| PVC | 50 g |
| VAZO 67 | 1 g |

Procedure

The standard procedure is used in the Example.

Result

The resulting initial mixture has a viscosity of approximately 1200 cps and is difficult to make uniform. Good foam was obtained with uniform cells with sizes from 0.5 to 1.2 mm, but with a very high density of about 171 kg/m³. The material is very rigid but brittle.

EXAMPLE 5

| | |
|---|---|
| MDI | 25 g |
| DOP | 8 g |
| Isopropyl | 2 g |
| Glycidyl | 6 g |
| DER | 3 g |

-continued

| | |
|---|---|
| N-Butyl | 3 g |
| Irgacure 819 | 0.3 g |
| Pentane | 4 g |
| Dinitrose | 6 g |
| Irganox 1135 | 0.3 g |
| PVC | 50 g |
| Terephthalic Acid | 2 g |

Procedure

The standard procedure was followed in this example.

Results

The initial mixture has normal fluidity, around 800 cps. The "embryo" obtained was very rigid but did not expand. The lack of expansion occurred most likely because the isocyanate had reacted at 175° C. with the terephthalic acid and the methacrylates inhibiting the following reactions.

Material with a density of about 863 kg/m³ was obtained.

EXAMPLE 6

| | |
|---|---|
| MDI | 25 g |
| DOP | 8 g |
| Isopropyl | 2 g |
| Glycidyl | 6 g |
| DER | 3 g |
| N-Butyl | 3 g |
| Irgacure 819 | 0.3 g |
| Pentane | 4 g |
| Dinitrose | 6 g |
| Irganox 1135 | 0.3 g |
| PVC | 50 g |
| Maleic Acid | 2 g |
| VAZO 67 | 1 g |

Procedure

The standard procedure was followed for this example.

Results

The same result as in the Example 5 was obtained, with the same density.

EXAMPLE 7

| | |
|---|---|
| MDI | 25 g |
| DOP | 8 g |
| Isopropyl | 2 g |
| Glycidyl | 6 g |
| DER | 3 g |
| N-Butyl | 3 g |
| Irgacure 819 | 0.3 g |
| Pentane | 4 g |
| Dinitrose | 6 g |
| Irganox 1135 | 0.3 g |
| PVC | 50 g |
| Succinic Acid | 2 g |
| VAZO 67 | 1 g |

Procedure

The standard procedure was followed in this example.

Results

The same result as in examples 5 and 6 with a density of 830 kg/m³.

We have concluded that, in the American and French patents (see Background of the Invention), the terephthalic, maleic and succinic acids are used as elements of cross-linking. However, repeated experiments have shown that it is not possible to use these crosslinkers in the presence of isocyanates, methacrylates, and VAZO 67 when they reach the temperature of 175° C. and a thermoset polymer is being formed having a density varying between 831 and 928 kg/m³ and that is impossible to expand.

EXAMPLE 8

| MDI | 25 g |
| --- | --- |
| DOP | 8 g |
| Isopropyl Glycidyl | 2 g |
| DER | 6 g |
| N-Butyl | 3 g |
| Irgacure 819 | 3 g |
| Pentane | 0.3 g |
| Dinitrose | 4 g |
| Irganox 1135 | 6 g |
| PVC | 0.3 g |
| SOL 225 EB Retarder | 50 g |
| VAZO 67 | 2 g |
| | 1 g |

Procedure

The standard procedure was used in this example.

Results

The initial paste had a viscosity of approximately 800 CPS. The foam was extremely elastic with uniform cells of 1 to 2 mm. The foam was very easy to bend but the foam product did not have a memory, that is it was not resilient and did not retake its original position after being bent. In addition, the foam, when made into a board with a thickness greater than 1.3 cm, broke when it was bent more than 22 degrees.

EXAMPLE 9

| MDI | 25 g |
| --- | --- |
| DOP | 8 g |
| Isopropyl Glycidyl | 2 g |
| DER | 6 g |
| N-Butyl | 3 g |
| Irgacure 819 | 3 g |
| Pentane | 0.3 g |
| Dinitrose | 4 g |
| Irganox 1135 | 6 g |
| PVC | 0.3 g |
| SOL 225 EB Retarder | 50 g |
| Methylene Chloride | 1 g |
| | 4 g |

Procedure

The standard procedure was followed in this example.

Results

The mixture was extremely liquid and had a low viscosity, i.e. less than 600 CPS. The resulting foam has very large cells with size of 4 mm or more. The material of the cell was excellent: hard but semi-elastic, with a high index of elongation before a rupture. The average density is 52.0 kg/m³.

During the development of the formation of the "embryo" inside of a mold, very high pressures resulted and, in spite of the fact that the mold was extremely hermetic, some material leaked between the lid and the mold.

EXAMPLE 10

| MDI | 25 g |
| --- | --- |
| DOP | 8 g |
| Isopropyl Glycidyl | 2 g |
| DER | 6 g |
| N-Butil | 3 g |
| Irgacure 819 | 3 g |
| Pentane | 0.3 g |
| Dinitrose | 4 g |
| Irganox 1135 | 6 g |
| PVC | 0.3 g |
| Methylene Chloride | 50 g |
| DC 193 | 4 g |
| | 1 g |

Procedure

The standard procedure was followed.

Results

When the DC 193 was included, the cells had a reduced size to as little as 1.25 mm. However, the density of the foam increased. These comparisons were made with the previous example, Example 9.

The initial mixture coagulated quickly and, in less than two minutes, lost its fluidity. Taking into account the fact that the standard time is less than seven minutes, this contributed to the emergence of some excessively large air bubbles, which remained trapped inside the block.

The obtained material has excellent mechanical properties with some large cell reaching 5 mm.

EXAMPLE 11

| MDI | 25 g |
| --- | --- |
| DOP | 8 g |
| Isopropyl Glycidyl | 6 g |
| Irgacure 819 | 8 g |
| Pentane | 0.3 g |
| Dinitrose | 5 g |
| Irganox 1135 | 6 g |
| PVC | 0.3 g |
| 2-Ethylhexyl Methacrylate | 50 g |
| | 8 g |

Procedure

The standard procedure was followed for this example.

The compound initially had a low viscosity: i.e. approximately 550 CPS. The foam was extremely rigid and crystalline, without flexibility. If a cut was made on the surface and force was applied, the foam block breaks along the line of the cut reflecting the crystalline structure in the formation of the polymer.

EXAMPLE 12

| MDI | 25 g |
| --- | --- |
| DOP | 8 g |

-continued

| | |
|---|---|
| Isopropyl | 6 g |
| Glycidyl | 6 g |
| DER | 2 g |
| N-Butil | 1 gram |
| Irgacure 819 | 0.3 g |
| Pentane | 5 g |
| Dinitrose | 6 g |
| Irganox 1135 | 0.3 g |
| PVC | 50 g |
| Butadiene Plastisol | 4 g |

Procedure

The standard procedure was followed in this example.

Results

The compound had normal initial viscosity. The resulting foam was very elastic and semi-rigid, with good cellular structure and an average density of 72 kg/m³.

The foam possesses ideal properties for absorbing impacts because it locally deformable without transmitting the force to the areas that have not been affected.

EXAMPLE 13

| | |
|---|---|
| MDI | 25 g |
| DOP | 8 g |
| Isopropyl | 6 g |
| Glycidyl | 6 g |
| N-Butyl | 1 g |
| Irgacure 819 | 0.3 g |
| Pentane | 5 g |
| Dinitrose | 6 g |
| Irganox 1135 | 0.3 g |
| PVC | 50 g |
| Hycar | 6 g |
| Azodicarbonamide (ADC) | 3 g |

Procedure

The standard procedure was followed for this example.

Results

A compound was produced with a low initial viscosity: i.e. approximately 500 CPS. The foam had excellent properties, similar to sample 12, with a density of about 51 kg/m³. The cells had an average size of 1 mm.

EXAMPLE 14

| | |
|---|---|
| MDI | 25 g |
| DOP | 8 g |
| Isopropyl | 6 g |
| Glycidyl | 15 g |
| DER | 10 g |
| Irgacure 819 | 1.2 g |
| Pentane | 5 g |
| Dinitrose | 6 g |
| Irganox 1135 | 0.3 g |
| PVC | 50 g |
| 2-Ethylhexyl Methacrylate | 6 g |
| Azodicarbonamide (ADC) | 2 g |

Procedure

The standard procedure was followed for this example.

Results

The initial compound was a very fluid mixture with very low density. The resulting foam had a very large cellular structure (cells having an average size of 3 mm), an extremely hard structure, little flexibility, and a density of 29 kg/m³. The membranes are very hard on the walls. The mechanical properties are ideal for lifejackets due to their floatability and capacity to absorb abrasion and impact.

EXAMPLE 15

| | |
|---|---|
| MDI | 25 g |
| DOP | 8 g |
| Isopropyl | 2 g |
| Glycidyl | 8 g |
| DER | 8 g |
| N-Butyl | 4 g |
| Irgacure 819 | 0.3 g |
| Pentane | 5 g |
| Dinitrose | 6 g |
| Irganox 1135 | 0.3 g |
| PVC | 50 g |
| Talco | 1.5 g |
| Methylene Chloride | 1.5 g |

Procedure

The standard procedure was followed in this example.

Results

The initial compound had a normal viscosity. The time of gelination was about 7.5 minutes. This amount of time is ideal for processing. The resulting foam had excellent cellular structure of about 1 mm, a density of about 67 kg/m³, and a good balance between flexibility and rigidity, which makes the product ideal for laminations of fiberglass.

I claim:

1. A rigid, closed-cell, graft-polymer foam made by a process that comprises:
   providing a polyvinylchloride (PVC) polymer backbone;
   grafting side chains to said PVC polymer backbone with isocyanate, said side chains including epoxy-acrylate monomers;
   initiating free radicals with ultraviolet or microwave radiation; and
   crosslinking said side chains to reach a post-cured state by polymerizing said monomers in said side chains with said free radicals.

2. The foam made according to the process of claim 1, the process further comprising combining the grafted PVC with an isocyanate, an expanding agent, a photoinitiator, and further epoxy-acrylate monomer polymerizable by said photoinitiator, said expanding agent releasing gases when heated, said photoinitiator being activatable a posteriori with ultraviolet radiation to release free radicals.

3. The foam made according to the process of claim 2, the process further comprising heating after the combining step to release said gases from said expanding agent.

4. The foam made according to the process of claim 2, process further comprising reducing a reaction pressure during the combining step to a negative pressure to prevent pre-polymerization of said isocyanate due to ambient humidity.

5. The foam made according to the process of claim 2, the process further comprising exposing said photoinitiator to ultraviolet radiation after the combining step to release said free radicals and to initiate polymerization and cross-linking of said combined monomers.

6. The foam made according to the process of claim 1, the process further comprising blending said grafted PVC polymer with a solvent having a boiling point at least as low as 75° C.

7. The foam made according to process of claim 6, the process further comprising selecting said solvent from the group consisting of a fluorocarbon, pentane, hexane, and an acetone.

8. The foam made according to the process of claim 1, the process further comprising selecting said monomers to set physical and/or mechanical properties of the foam.

9. The foam made according to the process of claim 8, the process further comprising selecting the physical and/or mechanical properties from the group consisting of flexibility, hardness, resistance to abrasion, and ductility.

10. A rigid closed-cell graft-polymer foam comprising:
a PVC polymer backbone; and
a side chain bonded to said PVC polymer backbone including a copolymerized vinyl monomer and epoxy-acrylate monomer, said copolymerized monomers having reached final expansion and a post-cured state by having a group ($CH_2=C$) polymerized by free radicals initiated by ultraviolet or microwave rays, wherein said said chais are crosslinked with a poly-isocyanate crosslinking agent.

* * * * *